United States Patent [19]
Arora

[11] Patent Number: 5,130,595
[45] Date of Patent: Jul. 14, 1992

[54] MULTIPLE MAGNETIC PATHS MACHINE

[75] Inventor: Ram S. Arora, Farmington, Mich.

[73] Assignee: Chrysler Corporation, Highland Park, Mich.

[21] Appl. No.: 630,632

[22] Filed: Dec. 20, 1990

Related U.S. Application Data

[63] Continuation-in-part of Ser. No. 346,336, Apr. 27, 1989, Pat. No. 4,980,595, which is a continuation of Ser. No. 123,758, Nov. 23, 1987, abandoned.

[51] Int. Cl.[5] ............................................. H02K 1/22
[52] U.S. Cl. ..................... 310/268; 310/114; 310/156; 310/208; 310/263
[58] Field of Search ............... 310/263, 268, 190, 90, 310/62, 63, 254, 89, 184, 161, 68 D, 114, 156, 198, 208

[56] References Cited

U.S. PATENT DOCUMENTS

| | | |
|---|---|---|
| Re. 31,950 | 7/1985 | Binns ................... 310/263 |
| 769,090 | 8/1904 | Johnson . |
| 3,132,272 | 5/1964 | MacFarlane . |
| 3,183,387 | 6/1964 | Wasnczuk . |
| 3,206,623 | 9/1965 | Snowdon . |
| 3,252,025 | 5/1966 | Brown et al. . |
| 3,305,740 | 2/1967 | Shano . |
| 3,392,294 | 7/1968 | Campbell . |
| 3,411,027 | 11/1968 | Rosenberg . |
| 3,423,619 | 1/1969 | Shaw . |
| 3,452,228 | 6/1969 | Woolley . |
| 3,459,980 | 8/1969 | Coroller . |
| 3,553,511 | 1/1971 | Hemmings et al. . |
| 3,555,327 | 1/1971 | Terry . |
| 3,571,637 | 3/1971 | Henningsen et al. . |
| 3,646,376 | 2/1972 | Anderson . |
| 4,110,642 | 8/1978 | Thiele . |
| 4,614,889 | 9/1986 | Ikegami et al. . |
| 4,882,515 | 11/1989 | Radomski ................. 310/263 |
| 4,980,595 | 12/1990 | Arora ........................ 310/263 |

FOREIGN PATENT DOCUMENTS

| | | |
|---|---|---|
| 112008 | 9/1964 | Czechoslovakia . |
| 1178145 | 9/1964 | Fed. Rep. of Germany ...... 310/263 |
| 1194962 | 6/1965 | Fed. Rep. of Germany ...... 310/263 |
| 972364 | 11/1964 | United Kingdom . |

Primary Examiner—R. Skudy
Attorney, Agent, or Firm—Mark P. Calcaterra

[57] ABSTRACT

Separate multiple flux paths for an electrical generator or motor are provided in a single rotor machine by axially mounting a plurality of pole pieces on the rotor shaft. Each pole piece includes a central disc portion having a plurality of radial pole-forming projections, with the projections of adjacent pole pieces rotated 180 electrical degrees, such that the pole-forming projections of every other pole piece have the same magnetic polarity. Provision of a plurality of separate magnetic flux paths increases the total flux attainable in a machine of given size and therefore improves the machine's output and efficiency.

5 Claims, 4 Drawing Sheets

MULTIPLE MAGNETIC PATHS MACHINE

This is a continuation-in-part of U.S. Patent Application Ser. No. 07/346,336, filed Apr. 27, 1989, which is a continuation of U.S. Patent Application Ser. No. 07/123,758, filed Nov. 23, 1987, now abandoned, which are each incorporated herein by reference.

BACKGROUND OF THE INVENTION

1. Field of the Invention

This invention relates generally to electrical machines and more particularly to an electrical generating machine or motor having multiple magnetic paths in a single rotor machine

2. Description of the Related Art

Electrical power machines, both generators and motors, which convert mechanical energy into electrical energy and visa versa have been built for about a century. These machines have been both direct current (DC) and alternating current (AC) types. The conversion of mechanical energy into electrical energy and visa versa, is accomplished by relative motion between magnetic fields and current carrying conductors Conventional electrical machines, both generators and motors, provide this relative motion between a conductor assembly and a component assembly producing a magnetic field. This movement is generally rotational about a central axis. The moving or rotating component assembly of the electrical machine is generally called a rotor and the stationary component is generally called a stator. As the rotor is turned in the case of a generator, producing the relative motion described above, magnetic lines of flux pass through the conductors producing an electromotive force in the conductors.

Conventional motors likewise require relative motion between a conductor assembly and a magnetic field in order to function In general, the rotor being driven mechanically or the stator being driven electrically determines whether the machine operates as a generator or a motor, respectively In a generator, if the rotor magnetic flux is increased, higher current will be produced in the stator conductors cut by the passing magnetic field, and therefore the output of a generator is increased. Similarly, increasing the rotational speed of the rotor may also increase the output current.

The primary difference between a motor and a generating machine involves the application of energy input In a generator, either DC or AC, the rotor is mechanically driven providing the relative motion between a magnetic field and current carrying conductors In a motor, a rotating magnetic field is provided by electrically driving the stationary stator. The rotating field then induces mechanical rotation of the rotor thus changing electrical energy into mechanical energy.

The following discussion centers on a description of an electrical generating machine However, the description is similarly applicable to an electrical motor machine.

A variety of designs of generating machines have been developed and placed in commercial use. Objectives of designers and manufacturers of these machines have always been the optimization of the power to weight ratio, minimization of the cost, space and speed required, increasing efficiency and reliability, decreasing failure rates, noise, and internal temperature rise, etc.

The rotor in a typical electrical generator comprises a central rotor shaft, a core made of a high magnetic permeability material, such as iron, mounted on the shaft, a current carrying coil wound onto the core, and two high permeability structures generally called pole pieces enclosing the core and coil The rotor core and pole pieces may be integral parts of a pole structure. The pole pieces are shaped to form north and south opposing magnetic poles when electrical current is passed through the rotor coil. At one end of the rotor shaft are positioned slip rings for passing electrical excitation current from an energy source associated with the stationary portion of the machine to the rotor coil The rotor may be constructed utilizing an electrical current carrying coil and pole pieces as described above forming electromagnets or by utilizing suitable permanent magnets positioned on the shaft.

Surrounding the rotor is the stator. The stator is generally cylindrical in shape and comprises ring shaped laminations of high permeability material. These laminations are wound with electrically conductive wire and positioned in a spatial configuration surrounding the rotor in the generator housing so as to generate electromagnetic force (EMF) when there is relative motion between the rotor and stator. This EMF causes the flow of electrical current within the windings of the stator when loaded.

Particularly for small electrical power generating machines and specifically for use in motor vehicles, the claw pole alternator has achieved wide acceptance as the most efficient means for producing electrical power for use in an automobile.

In a claw pole alternator, the pole structure is basically a pair of pole pieces generally made of flat circular metal plates having central bores positioned axially on the rotor shaft on either side of the rotor core and coil. Each pole piece has projecting fingers or claws which are bent over the rotor coil in a direction parallel to the rotor axis. When so bent and positioned, each claw interposes between claws of the opposite pole piece. The pole pieces may be manufactured by metal stamping, forging, machining, or other manufacturing processes.

When current is passed through the rotor coil, the claws become electromagnetic poles of opposite polarity As the rotor is rotated, these poles having opposite polarity produce a magnetic field which alternates in polarity as seen by the stator winding conductors, thus producing alternating current at the output of the alternator. In automotive applications, this alternating current (AC) is generally rectified into direct current (DC) for use in the automotive electrical systems. The AC may also be used directly.

Figure 1:
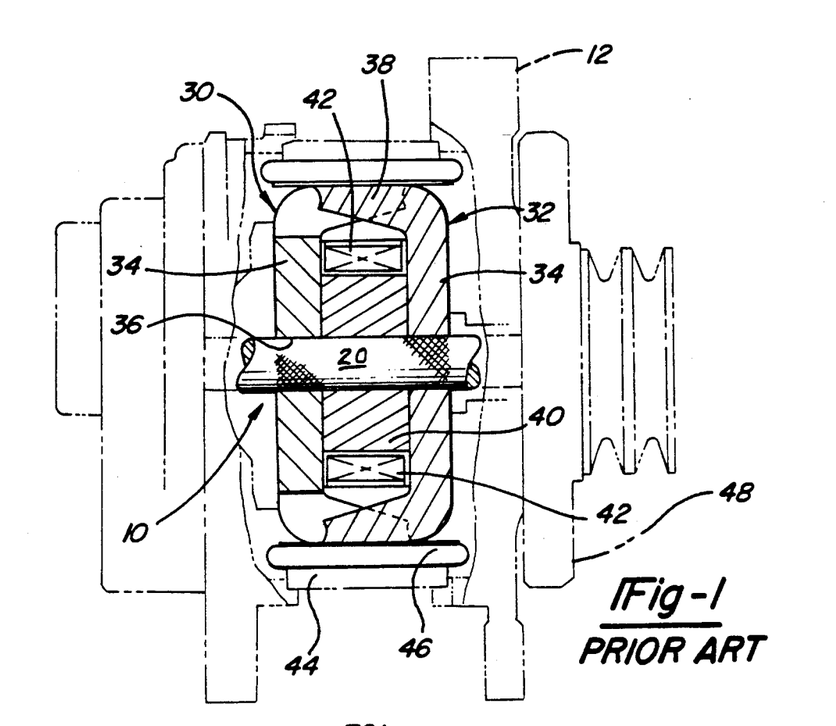
FIG. 1 is a side view of a prior art conventional claw pole alternator with a portion broken away to show the rotor structure.

In order to clearly illustrate the differences between conventional machines and the present invention, a discussion of a conventional machine shown in FIG. 1 is believed appropriate at this point.

An assembled internal structure of rotor assembly 10 of a conventional claw pole alternator is shown in FIG. 1. Fixed to rotor shaft 20 is a single pole structure comprising a pair of pole pieces 30 and 32. Each pole piece 30 and 32 is identical and comprises a central disc portion 34 having a centrally disposed bore 36 and a plurality of equally spaced apart projections, or claws, 38 which are bent approximately 90 from the plane of disc portion 34 and extend from the outer periphery of disc, portion 34 parallel to the axis of rotor shaft 20 over rotor coil 42.

Pole pieces 30 and 32 are positioned on shaft 20 with claws 38 facing in opposite directions and positioned such that claws 38 on pole piece 30 are interposed between claws 38 of pole piece 32. Between pole pieces 30 and 32 and mounted on shaft 20 is rotor core 40 which is comprised of a material having a high magnetic permeability, such as iron or an iron laminate Rotor core 40 is of cylindrical shape having a centrally disposed bore for mounting on shaft 20. Positioned over rotor core 40 is rotor coil 42. The combination of core 40 and adjacent pole pieces 30 and 32 with claws 38 effectively surrounds rotor coil 42.

When an electrical current is passed through rotor coil 42, a magnetic flux is set up in pole pieces 30 and 32, effectively making pole pieces 30 and 32 magnet poles having opposite polarity. Thus claws 38 on pole piece 30 will have one magnetic polarity, while claws 38 on pole piece 32 have the opposite magnetic polarity.

Stator core 44 surrounds rotor assembly 10. Stator windings 46 are in turn wrapped around stator core 44. In order to provide cooling to stator and rotor windings 46 and 42, respectively, fan 48 is attached to rotor shaft 20 adjacent stator and end shield assembly 12.

In conventional motors, generators and alternators, the rotor assembly includes a single pole structure, such as shown in FIG. 1, comprising a set of two pole pieces, a coil and core. The core may be an integral part of the pole pieces. The geometry of the pole structure depends upon the total flux it has to carry, the maximum rotational speed it must withstand, the method of manufacturing, noise characteristics, etc.

For a given unit size, then, optimizing all parameters in a conventional electrical generating machine or motor machine will allow the production of a certain fixed output capacity. Thus if the electrical circuit needs or mechanical torque requirements are greater than this capacity, then either a larger electrical generating or motor unit is needed or an additional unit is needed in order to supply the requirements of the load. Particularly for automotive applications, where space is at a premium, these alternatives are undesirable.

The designs which have been produced for many decades have had limitations and problems of which the following are exemplary. First, present alternator designs have generally low efficiencies. Particularly where increased alternator outputs and smaller engine size are important, efficiency has become extremely important. Second, in present claw-pole type alternator designs, in order to achieve a higher output, longer projecting claws are required. In addition, higher speeds are required which produce excessive noise which is difficult to prevent. Third, relatively thick pole pieces and long claws are required to carry the necessary magnetic flux. Finally, increase in the output of present machines causes winding temperatures to also rise, posing an additional thermal limitation on the design.

SUMMARY OF THE INVENTION

It is an object of the present invention to increase the achievable output of a generating or motor machine having a given size beyond that presently achievable in conventional designs.

It is a further object of the present invention to increase the efficiency of a generating or motor machine significantly beyond that presently achievable in conventional designs.

It is a still further object of the present invention to lower rotor noise levels below that presently achievable in conventional designs.

These and other objects and advantages of the invention are achieved by utilizing multiple magnetic pole structures stacked axially on the rotor shaft to create multiple flux paths. This multiplicity of pole structures providing multiple flux paths produces a higher total flux than has previously been attainable, thus allowing an improved output capability.

By providing multiple pole structures positioned axially along the rotor shaft adjacent to one another which creates multiple magnetic flux paths, conductors within the stator are cut by the higher flux produced in the rotor per unit angular displacement of the rotor, thus producing a higher output current in a generator having given parameters.

In the multiple pole structure designs encompassed by the present invention, for any total flux that is needed for a particular design, the core and pole cross sectional areas are approximately inversely proportional to the number of pole structures utilized. In other words, if two pole structures are utilized producing two separate magnetic flux paths, the cross sectional area per pole structure required for a given total flux is cut in about half. If three pole structures are utilized producing three separate magnetic flux paths, the total core and pole cross sectional area per pole structure required for a given flux is reduced to about one-third compared to that area required in a single pole structure design. This reduction in cross sectional area consequently reduces the weight and/or cost of the resulting rotor structure for any total magnetic flux. Also, the pole piece claws can be shorter resulting in overall less noise, requiring fewer ampere turns for a given amount of flux produced, and the pole claw shape can be made closer to an ideal shape thus lowering the air gap flux density.

Conversely, for a given alternator structure size, the magnetic flux producible may be greatly increased in accordance with this invention thus increasing the output capability for a generator of given size. In addition, for a generator of given size, a longer stator core may be utilized as well as stator windings with fewer turns. This results in a lower temperature rise, and of course an increase in overall unit efficiency.

Therefore, the present invention is capable of meeting the increased current requirements of vehicles without the necessity for providing additional generating units by virtue of increasing the output capacity of a single generating unit using the present invention.

Another feature of the present invention is that in the multiple pole structure rotor design, some pole structures may be constructed using suitable permanent magnet materials and some structures may be constructed using coils carrying exciter current. The current carrying coils may then be utilized to control the total flux produced in the rotor and thus the output of the generating assembly.

Similarly, the multiple pole structures, creating multiple flux paths, of the present invention may be utilized in an electrical motor to provide a higher, more efficient mechanical output and smaller overall size than achievable in conventional machines.

According to the invention, a rotating machine having a stationary housing, a rotor supported by the housing and stator windings and a stator core in the housing calls for a rotor means including a rotor shaft rotatably mounted in the housing, a plurality of pole pieces axially spaced along the shaft, and a plurality of magnetic flux supporting elements, each mounted for rotation with the shaft between adjacent pole pieces. Each pole piece comprises a central disc portion surrounding the shaft and has a plurality of pole forming projections extending only radially from the central disc portions with gaps therebetween, the pole forming projections at each pole piece being rotationally positioned 180 electrical degrees from pole forming projections of axially adjacent pole pieces such that the pole-forming projections of every other pole piece have the same magnetic polarity The invention additionally contemplates a rotor assembly for a rotating machine having a stationary housing and a stator winding and a stator core in the housing. The rotor assembly comprises a rotor shaft rotatably mounted in the housing, a plurality of pole pieces stacked axially and spaced along the shaft, and a plurality of magnetic flux elements each mounted for rotation with the shaft between adjacent pole pieces. The plurality of pole pieces includes first and second end pole pieces positioned at opposite first and second ends of the stacked plurality, the first and second end pole pieces each comprising a central disc portion surrounding the shaft and having a plurality of radial pole-forming projections with gaps therebetween, each projection including a portion bent so as to extend axially of the shaft, with bent portions of the first end pole piece extending toward the second end pole piece and bent portions of the second end pole piece extending toward the first end pole piece. The plurality of pole pieces further includes at least one intermediate pole piece positioned on the shaft between the first and second end pole pieces, each intermediate pole piece comprising a central disc portion surrounding the shaft and having a plurality of radial pole-forming projections with gaps therebetween, each projection including a portion bent so as to extend axially in both directions of the shaft. Adjacent pole pieces mounted on the shaft are positioned such that their bent portions are interposed in each other's gaps, the pole forming projections of each pole piece being rotationally positioned 180 electrical degrees from the pole forming projections of axially adjacent pole pieces, such that the pole forming projections of every other pole piece have the same magnetic polarity.

BRIEF DESCRIPTION OF THE DRAWINGS

Further objects, features and advantages of this invention will become apparent from a reading of the following detailed description, taken in conjunction with the accompanying drawings, in which.

DETAILED DESCRIPTION

While the following description specifically refers to alternators arranged according to principles of the present invention, the present invention applies equally well to motors. The teachings in the detailed description that follows are merely illustrative, showing two preferred embodiments of the present invention.

Figure 2:
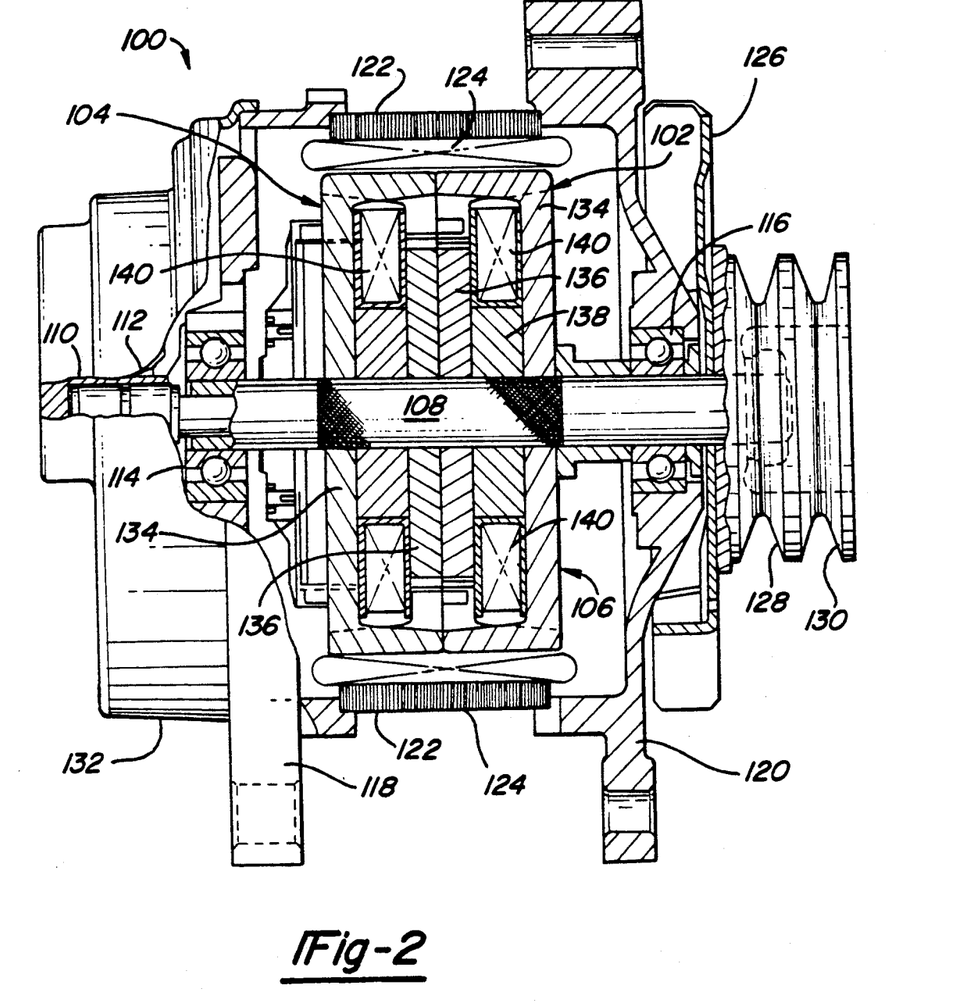
FIG. 2 is a side view with portions broken away to illustrate a claw pole alternator having two rotor pole structures.

A claw pole alternator assembly 100 having two rotor pole structures 102 and 104 is shown in FIG. 2.

Rotor assembly 106 comprises shaft 108, rotor pole structures 102 and 104 mounted on shaft 108, and a pair of slip rings 110 and 112 mounted on one end of shaft 108. Rotor assembly 106 is rotatably supported by bearings 114 and 116 which are in turn supported respectively by end shield 118 and stator and end shield assembly 120. Mounted between end shields 118 and 120 is stator core 122 and stator winding 124. Stator core 122 is essentially a stacked series of generally ring shaped discs of high permeability material such as iron. Wrapped around the stator core is stator winding 124. Although not shown in the view of FIG. 1, stator core 122 presents a toothed surface inward toward the outer surface of rotor pole structures 102 and 104. In order to provide some cooling to the stator windings during alternator operation, fan 126 is fixed to shaft 108 outside end shield 120. Adjacent fan 126 and also fixed to shaft 108 are drive pulleys 128 and 130. These pulleys are, in turn, belt driven from a prime mover (not shown).

On the opposite end of the rotor assembly to pulleys 128 and 130, shaft 108 extends through end shield 118 and into cover 132. Although not shown, a conventional rectifier assembly is bolted to end shield 118 along with a brush assembly. The brush assembly holds brushes which make contact with slip rings 110 and 112 to transfer electrical current from an electrical power source such as a battery to the rotating coils 140 on rotor assembly 106.

The internal structure of rotor assembly 106 in the claw pole alternator according to the present invention is shown in FIG. 2 as having two rotor pole structures 102 and 104, each creating a separate magnetic flux path during alternator operation. Fixed to rotor shaft 108, each rotor pole structure 102 and 104 comprises a pair of pole pieces 134 and 136, a core 138, and coil 140.

Figure 3:
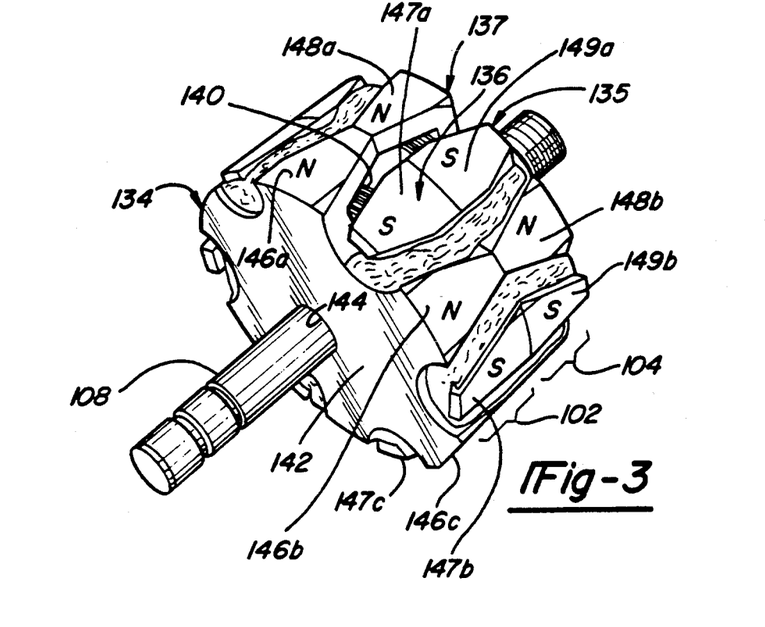
FIG. 3 is a perspective view of the rotor assembly portion of FIG. 2.

As shown in FIG. 3, pole piece 134 of rotor structure 102 comprises disc portion 142 having a centrally disposed, bore 144 and equally spaced apart radial pole forming projections having claws such as 146a, 146b and 146c which are bent approximately 90° from the plane of disc portion 142 and extending from the outer portion of disc portion 142 so as to project parallel to the axis of shaft 108 and extend over coil 140 when pole pieces 134 and 136 are mounted on shaft 108. Pole piece 136 of rotor structure 102 is identical to pole piece 134, but has its claws, such as 147a, 147b and 147c facing opposite axially to claws 146a,b,c and interleaved therewith, as shown in FIG. 3.

For the generator rotor assembly set forth in FIG. 3, it will therefore become apparent to those skilled in the art that upon supplying excitation current to coil 140 with the claws 146a,b,c and 147a,b,c of pole structure 102 arranged as shown, the claws will have a magnetic polarity of one sense in pole piece 134 and an opposite sense in pole piece 135. For example, as shown in FIG. 3, all the claws of pole piece 134 will have a north, N, magnetic polarity, while the claws of the pole piece 136 will have a south, S, polarity. Likewise, the claws 149a,b pole piece 135 will have a south, S, polarity, while the claw 148a,b of pole piece 137 will have a north, N, polarity.

Hence, a flux path will be established, for example, in pole structure 102 wherein the flux will exit pole piece 134 from the north polarity claws, enter the stator core, cut the stator windings, and return to the rotor assembly via the claws 147a,b,c which are of a south polarity in pole piece 136.

In the claw pole rotor assembly set forth in FIGS. 2 and 3, the intermediate south pole pieces 136 and 135 are shown and described as separate pole pieces with one piece serving as part of pole structure 102 and other piece 135 serving as part of pole structure 104. In an alternative arrangement set forth in the exploded perspective view of FIG. 4, intermediate pole pieces are formed with dual claws or bent portions extending in both directions along the axis of the rotor shaft.

Figure 4:
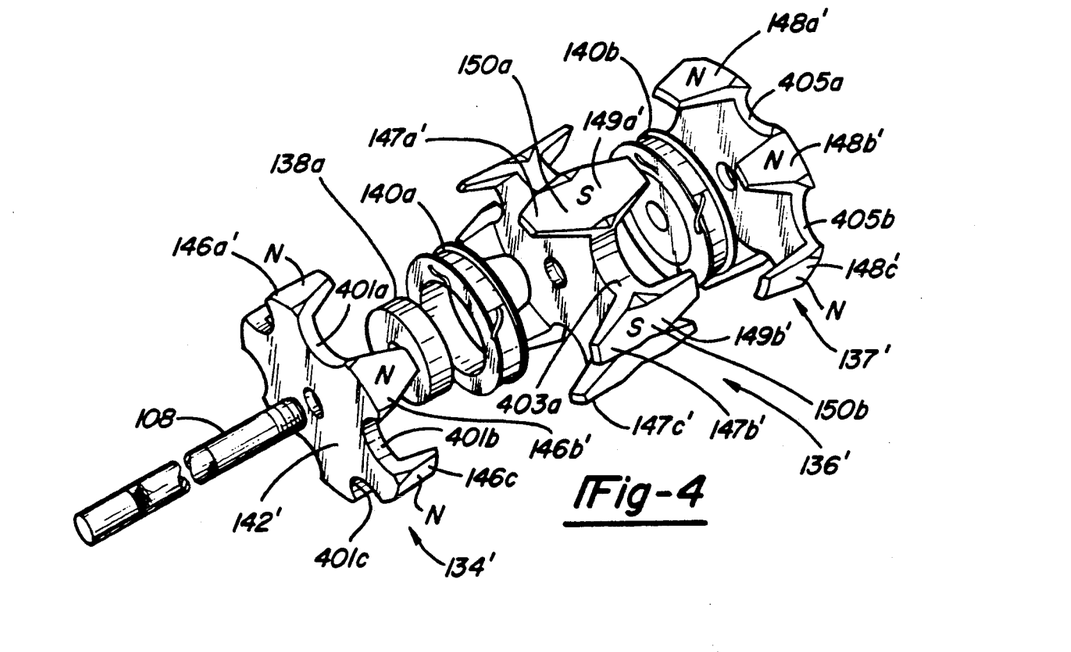
FIG. 4 is an exploded perspective view of an alternative embodiment of a rotor assembly arranged in accordance with the principles of the invention.

As seen from FIG. 4, the rotor assembly is comprised of a plurality of pole pieces such as 134', 136' and 137'. Pole pieces 134 and 137 are seen to comprise end pole pieces having their respective claw portions 146a', 146b', etc. facing the claw or bent portions 148a', 148b', etc. of end piece 137'. Intermediate the end pole pieces is at least one intermediate composite pole piece such as 136 which is equipped with composite claws which extend along the axis of rotor shaft 108 in both directions. For example, each composite claw 150a, 150b, etc. is comprised of a first portion 147a', 147b', etc. extending axially to the left, and a second portion 149a', 149b', etc. extending axially to the right along rotor shaft 108. Between each adjacent pair of pole pieces is contained a rotor core and surrounding rotor coil. For example, core 138a and coil 140a rest between pole pieces 134' and 136', while coil 140b and its accompanying core (not shown) are positioned between pole pieces 136' and 137'. Alternatively, permanent magnets could be placed at these positions.

Other than the fact that their respective claws extend in opposite axial directions, end pole pieces 134' and 137', are of identical construction. For example, end piece 134 has a central disc portion 142' and a plurality of radial pole forming projections 146a', 146b', etc. each having a bent portion extending axially of the rotor shaft. Gaps 401a, 401b, 401c, etc. separate the pole forming projections and associated claws or bent portions. Similarly, gaps 405a, 405b, etc. separate the pole forming projections and associated claws 148a', 148b', 148c', etc.

Adjacent pole pieces are positioned 180 electrical degrees apart, thereby establishing opposite magnetic polarities in their respective claws. Also, as seen from FIG. 4, in a manner similar to the arrangement set forth in FIGS. 2 and 3, it is seen that adjacent pole pieces mounted on rotor shaft 108 are arranged such that their bent portions or claws are interposed in each other's gaps.

It will be seen that more than one intermediate pole piece with claws extending in both axial directions can be placed between end pole pieces 134' and 137', the only requirement being that adjacent intermediate pieces are 180 electrical degrees out of phase with adjacent pole pieces. This embodiment offers the advantage of fewer mechanical parts due to the composite nature of the claws of the intermediate pole pieces such as pole piece 136' of FIG. 4.

The rotor cores such as 138a are comprised of a material having a high permeability, such as iron or an iron laminate Core 138a is of cylindrical shape having a centrally disposed bore to fixedly position core 138a on shaft 108. Positioned over the core 138a is coil 140a. The combination of core 138a and adjacent pole pieces 134' and 136' with respective claws 146a', etc. and 147a', etc. effectively surround rotor coil 140a.

When an electrical current is passed through rotor coil 140a, a magnetic flux is set up in pole pieces 134' and 136' effectively establishing pole pieces 134' and 136' as magnetic poles having opposite polarity. For example, the magnetic polarity shown in FIG. 4 is north, N, for pole pieces 134' and 137' and south, S, for pole piece 136'.

Figure 5:
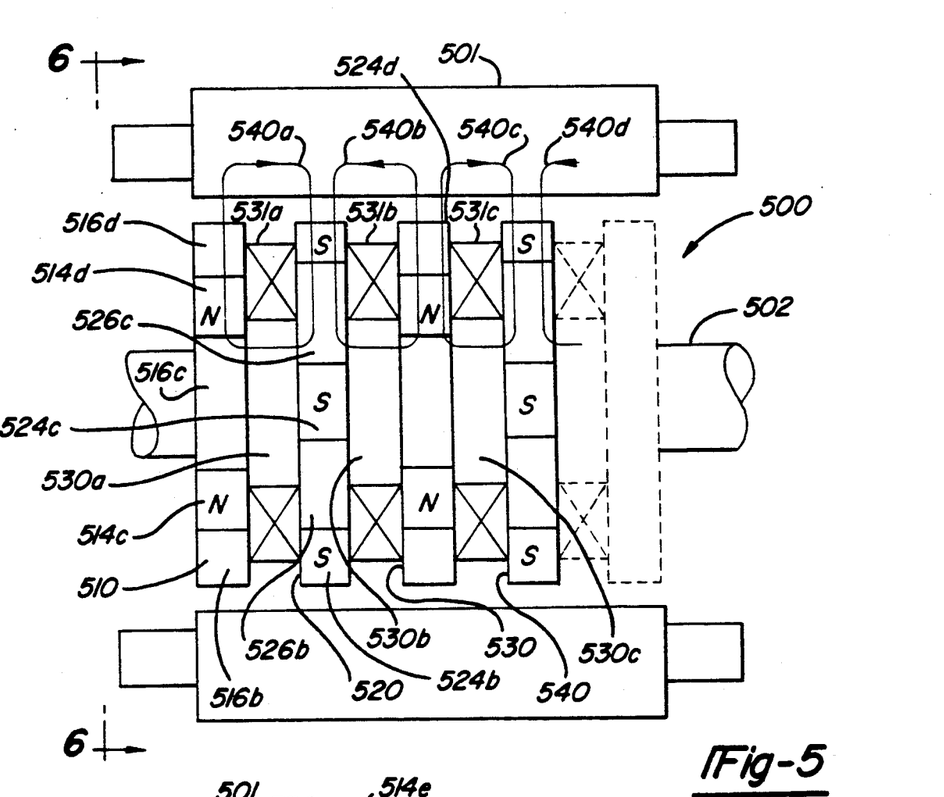
FIG. 5 is a side view of a multiple magnetic path alternator which is a second alternative embodiment of the invention.
Figure 6:
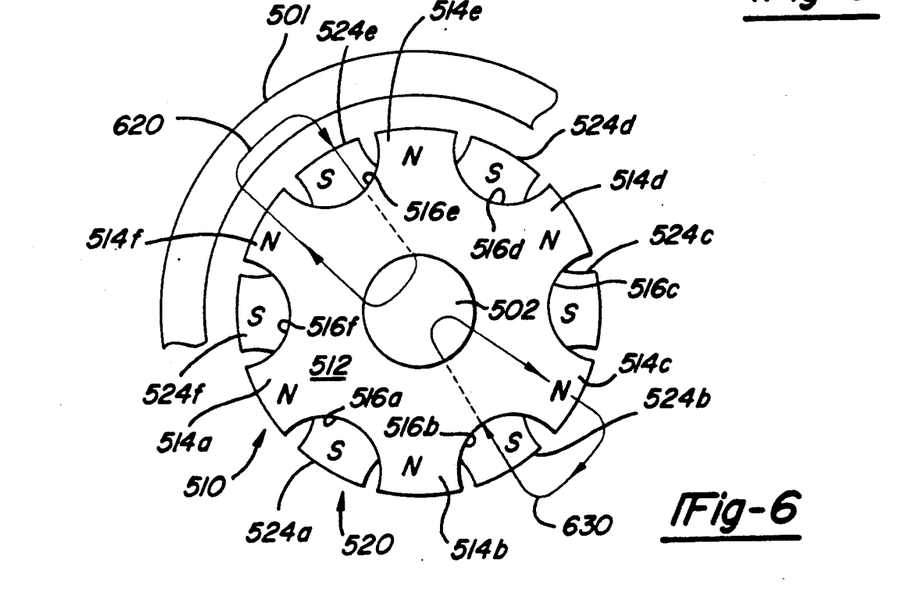
FIG. 6 is a view of the alternative embodiment of FIG. 5 taken along line 6—6.

Yet another embodiment of a multiple magnetic path machine arranged in accordance with the principles of the invention is set forth in FIGS. 5 and 6. While claw pole rotor structures arranged in accordance with the invention offer advantages over prior art approaches and operate quite satisfactorily, rotor structures incorporating such claws may present some problem areas. It has been discovered that a multiple path machine employing pole pieces without axially extending claw portions, such as the arrangement set forth in FIGS. 5 and 6, offers advantages over rotor assemblies having claws. One advantage of such a "clawless" arrangement is significantly reduced magnetic noise which may be caused in claw type rotor assemblies by vibration of the axially extending claws upon rotation of the rotor assembly. Additionally, improved rotor coil cooling is possible if the rotor coils are not totally surrounded by the pole pieces and their respective interleaved claws. Still a further advantage of an arrangement as set forth in FIGS. 5 and 6 is the simplified construction of the pole pieces resulting in more economical manufacturing and assembly costs for same. Additionally, larger rotor coils may be provided in the same space where no claws are used since the coils can extend to the outer periphery of the pole pieces which, in the claw type rotor assembly, would be taken up by the claw material itself.

With reference to FIGS. 5 and 6, a side view of a rotor assembly 500 arranged in accordance with the principles of the invention, is set forth in FIG. 5 and an end view of the same assembly taken along line 6,6 of FIG. 5 is set forth in FIG. 6. Rotor assembly 500 is mounted for rotation with rotor shaft 502 and is surrounded by a stator assembly 501.

The rotor assembly is principally comprised of a plurality of pole pieces 510, 520, 530, and 540 axially spaced along rotor shaft 502 such that excitation flux elements may be spaced between adjacent pole pieces. In the embodiment of FIGS. 5 and 6, the flux elements are comprised of a magnetically permeable core such as 530a surrounded by a current carrying coil 531a. Similar elements bearing the last letter b and c are shown interposed between succeeding pole pieces of FIG. 5.

Each of the plurality of pole pieces, such as pole piece 510, are comprised of a central disc portion 512 for receipt of rotor shaft 502 such that the pole pieces fixedly attached for rotation therewith. Radially extending from the central disc portion 512 is a plurality of radial pole-forming projections 514a through 514f, each separated by gaps 516a through is to.. be noted that these pole forming radial 516f. It is to be noted that these pole forming radial projections 514a through 514f extend in the radial direction only and have no bent portions or claws extending in a direction normal to a plane of the pole piece disc.

As seen from FIG. 6, each pole piece is rotationally displaced 180 electrical degrees from its adjacent neighbors such that the radial pole forming projections are disposed in axial alignment with the gaps of adjacent pole pieces Hence, the pole forming projections 524a through 524f of pole piece 520 are axially aligned with gaps 516a through 516f, respectively, of pole piece 510.

With this arrangement, when a excitation flux is provided by the coils 531a, etc. circulating around cores 530a, etc., it will be seen that each radial pole forming projection on each pole piece will assume the same magnetic polarity and that this magnetic polarity will be of an opposite sense as one proceeds axially along the stack of pole pieces in the rotor assembly 500. For example, as seen from FIGS. 5 and 6, the radial projections of pole piece 510 have north, N, magnetic polarity, the pole projections of pole piece 520 have south, S, polarity, the projections of pole piece 530 have N polarity, etc., in alternating fashion along the stack.

In the arrangement of FIG. 5, it is seen that a plurality of separate magnetic paths are supported by adjacent pairs of pole pieces in conjunction with the stator core in stator assembly 501 and a portion of rotor shaft 502. These flux paths 540a, 540b, 540c, etc. are seen passing flux out of north pole segments and into a south pole segment of an adjacent pole piece. Likewise, two examples of flux paths are shown at 620 and 630 of FIG. 6. It is to be understood that the actual flux paths shown are not contained within the plane of the drawing figures in which they are presented. For example, it will be seen that at flux path 620, as the magnetic flux leaves radial pole forming projection 514f and enters into stator core material of stator assembly 501, the flux will actually flow somewhat into the page as one views FIG. 6, such that it will exit the stator in the vicinity of pole projection 524e of adjacent pole piece 520. It is also seen from FIG. 6 that a portion of the rotor shaft itself may form a part of the magnetic paths where the flux excitation means comprises an electromagnet utilizing coils such as 531a and cores such as 530a.

Figure 7:
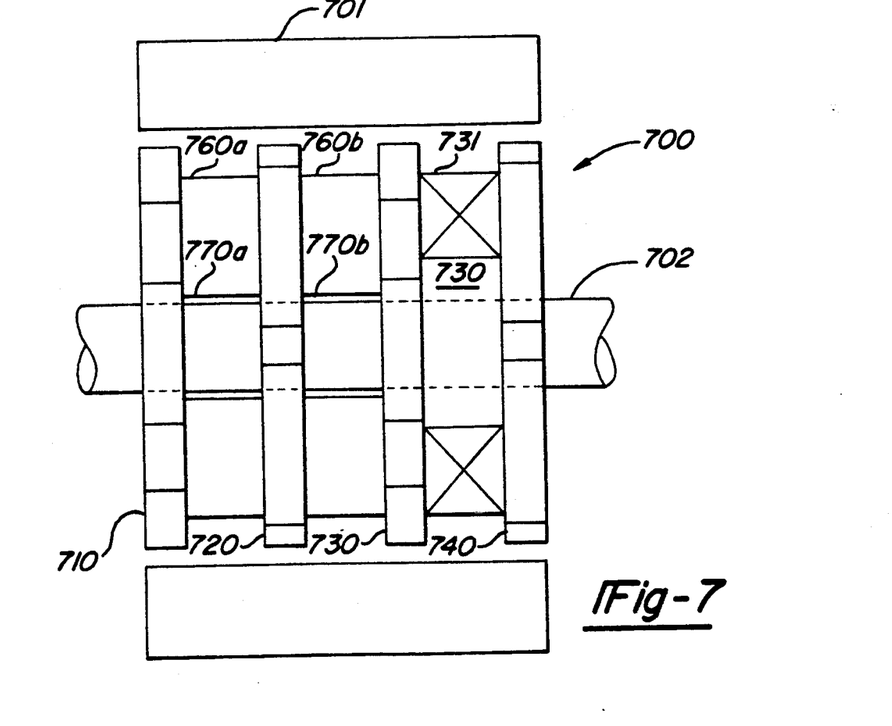
FIG. 7 is an alternator assembly having rotor pole pieces similar to those of the embodiment of FIGS. 6 and 7, but including both rotor electromagnets and permanent magnets as sources of excitation.

Yet another version of the arrangement of FIGS. 5 and 6 is set forth in FIG. 7. The only difference in the arrangement of FIG. 7 from that of FIG. 5 is that the flux excitation means provided between certain of the pole pieces comprises a permanent magnet with an isolation sleeve separating the permanent magnet from the rotor shaft. In combination with the permanent magnet type excitation element, an electromagnet is provided between two of the pole pieces such that the total excitation of the rotor assembly may be varied.

With reference to FIG. 7, rotor assembly 700 which is surrounded by stator assembly 701 is comprised of a plurality of pole pieces 710, 720, 730 and 740 axially spaced along rotor shaft 702, such that permanent magnet 760a lies between pole pieces 710 and 720, permanent magnet 760b lies between pole pieces 720 and 730, and an electro magnet utilizing coil 731 and magnetically permeable core 730 lies between pole pieces 730 and 740. Isolating magnetically each permanent magnet from rotor shaft 702 is a non-magnetic sleeve. Sleeve 770a surrounds shaft 702 radially inwardly of annular magnet 760a, while sleeve 770b surrounds shaft 702 radially inwardly of annular magnet 760b.

As with the arrangement of FIG. 5, alternating pole pieces along the axial stack assume alternating magnetic polarities. Additionally, each pole piece in the stack has the identical configuration to that shown in FIG. 6 namely, a central disc portion from which extends a plurality of radial pole forming projections extending only in a radial direction.

The rotor assemblies of these embodiments of the present invention provide several important benefits to alternator design. Because the rotor pole structure is smaller, the alternator will produce more output per unit weight. Also, lower magnetic noise will be generated at a given speed. Because of the reduced size of the pole pieces required in this invention, the cost for producing stampings for use as pole pieces is reduced and therefore machinings or forgings are not required in order to minimize the bend radius problem so as to maximize the surface area of the claw or claws adjacent the stator core.

Another advantage of this invention is that as more flux is produced, for a given output required, the smaller the number of stator winding turns that are required. As losses are primarily due to heating in the stator winding, reducing the winding turns will reduce this heating loss and therefore will increase alternator efficiency. This in turn will then require less power input for a given electrical power output.

From the above description it is seen this invention provides an improved rotor design in an electrical machine, either motor or generator, utilizing multiple magnetic flux paths to facilitate increased electrical output, efficiency, and versatility. The instant invention has been described in an illustrative manner and it is to be understood that the terminology which has been used is intended to be in the nature of words of description rather than of limitation.

Obviously many modifications and variations of the present invention are possible in light of the above teachings. It is therefore to be understood that within the scope of the appended claims, the invention may be practiced otherwise then as specifically described.

I claim:

1. In a rotating machine having a stationary housing, a rotor means supported by said housing, and stator windings and a stator core in the housing, the rotor means comprising:

a rotor shaft rotatably mounted in the housing;

a plurality of pole pieces axially spaced along the shaft;

a plurality of magnetic flux means, each mounted for rotation with the shaft between adjacent pole pieces; and each pole piece comprising a central disc portion surrounding the shaft and having a plurality of pole-forming projections extending only radially from the central disc portion with gaps therebetween, the pole-forming projections of each pole piece being rotationally positioned 180 electrical degrees from the pole-forming projections of axially adjacent pole pieces, such that the pole-forming projections of every other pole piece have a like magnetic polarity;

whereby a plurality of separate magnetic flux paths is established, each flux path supported by a pair of the adjacent pole pieces and the stator core.

2. The rotor means of claim 1, wherein at least one of the magnetic flux means comprises:

a magnetically permeable core mounted on said shaft; and a current carrying coil encircling the core.

3. The rotor means of claim 1, wherein at least one of the magnetic flux means comprises:

a non-magnetic sleeve surrounding said shaft; and a permanent magnet surrounding said sleeve.

4. The rotor means of claim 2, wherein at least another one of the magnetic flux means comprises:

a non-magnetic sleeve surrounding said shaft; and a permanent magnet surrounding said sleeve.

5. In a rotating machine having a stationary housing, a rotor means supported by said housing, and stator windings and a stator core in the housing, the rotor means comprising:

a rotor shaft rotatably mounted in said housing;

a plurality of pole pieces stacked axially spaced along the shaft;

a plurality of magnetic flux means, each mounted for rotation with the shaft between adjacent pole pieces; and the plurality of pole pieces including first and second end pole pieces positioned at opposite first and second ends of stacked the plurality of pole pieces, the first and second end pole pieces each comprising a central disc portion surrounding the shaft and having a plurality of radial pole-forming projections with gaps therebetween, each projection including a portion bent so as to extend axially of the shaft, with bent portions of the first end pole piece extending toward the second end pole piece and bent portions of the second end pole piece extending toward the first end pole piece, the plurality of pole pieces further including at least one intermediate pole piece positioned on the shaft between the first and second end pole pieces, each intermediate pole piece comprising a central disc portion surrounding the shaft and having a plurality of radial pole-forming projections with gaps therebetween, each projection including a portion bent so as to extend axially in both directions of the shaft; and adjacent pole pieces mounted on the shaft such that their bent portions are interposed in each other's gaps, the pole-forming projections of each pole piece being rotationally positioned 180 electrical degrees from the pole-forming projections of axially adjacent pole pieces, such that the pole-forming projections of every other pole piece have same magnetic polarity;

whereby a plurality of separate magnetic flux paths is established, each flux path supported by a pair of adjacent pole pieces and the stator core.

* * * * *